United States Patent Office.

BERNHARD HEYMANN, OF ELBERFELD, GERMANY, ASSIGNOR TO THE FARBENFABRIKEN OF ELBERFELD COMPANY, OF NEW YORK.

DIACETYL-INDOXYL AND PROCESS OF MAKING SAME.

SPECIFICATION forming part of Letters Patent No. 618,096, dated January 24, 1899.

Application filed July 30, 1898. Serial No. 687,265. (No specimens.)

*To all whom it may concern:*

Be it known that I, BERNHARD HEYMANN, doctor of philosophy, chemist, residing at Elberfeld, Germany, (assignor to the FARBENFABRIKEN OF ELBERFELD COMPANY, of New York,) have invented a new and useful Improvement in the Manufacture of Diacetyl-Indoxyl; and I hereby declare the following to be a clear and exact description of my invention.

My invention relates to the production of diacetyl-indoxyl having most probably the formula:

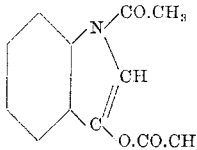

and it consists in treating alkaline salts of phenylglycinorthocarbonic acid having the formula:

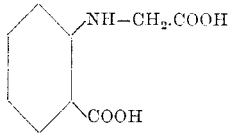

with acetic anhydrid. According to my researches the same result is obtained if instead of the alkaline salts a mixture of the free phenylglycinorthocarbonic acid with alkaline acetates is used, or if instead of the phenylglycinorthocarbonic acid its acetyl derivative is employed, which has the formula:

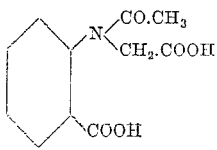

In carrying out my new process practically I can proceed as follows, (without limiting myself to the particulars given:) One kilo, by weight, of dry and finely-pulverized disodium salt of phenylglycinorthocarbonic acid is gradually stirred into five kilos, by weight, of boiling acetic anhydrid. When the development of carbonic acid which takes place during the reaction has ceased, the acetic anhydrid is distilled off *in vacuo* and the residue is washed with cold water. Thus a weakly-yellowish crystalline mass is obtained, which is the new diacetyl-indoxyl. It can be further purified by recrystallization from hot alcohol.

When pure and pulverized, the new compound is a white powder. It crystallizes from hot alcohol in the shape of colorless needles, melting at 82° centigrade. As above mentioned, the new compound has most probably the formula:

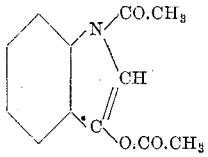

It is nearly insoluble in water, but easily soluble in alcohol, ether, and acetone. When heated with caustic lyes, it is saponified, a solution of indoxyl being formed, from which on the introduction of a current of air indigo is separated.

Having now described my invention and in what manner the same is to be performed, what I claim as new, and desire to secure by Letters Patent, is—

1. The process for the production of diacetyl-indoxyl, which process consists in first heating an alkaline salt of phenylglycinorthocarbonic acid with acetic anhydrid and secondly isolating the diacetyl-indoxyl thus produced from the reaction mixture, substantially as hereinbefore described.

2. As a new article of manufacture the new diacetyl-indoxyl having most probably the formula:

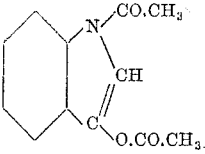

being a white powder, nearly insoluble in water, easily soluble in alcohol, ether and acetone, crystallizing from a hot alcoholic solution in the shape of colorless needles melting at 82° centigrade, being when heated with caustic lyes transformed into indoxyl, the latter yielding indigo by oxidation, substantially as hereinbefore described.

In testimony whereof I have signed my name in the presence of two subscribing witnesses.

BERNHARD HEYMANN.

Witnesses:
R. E. JAHN,
OTTO KÖNIG.